(12) United States Patent  
Saito et al.

(10) Patent No.: US 8,681,360 B2  
(45) Date of Patent: Mar. 25, 2014

(54) IMAGE FORMING APPARATUS, IMAGE FORMING METHOD, AND COMPUTER PROGRAM PRODUCT

(75) Inventors: Yuka Saito, Tokyo (JP); Daisuke Okada, Kanagawa (JP); Nobuhiro Shindo, Tokyo (JP); Hideaki Matsui, Kanagawa (JP); Naohiko Kubo, Kanagawa (JP); Nobuyuki Iwata, Kanagawa (JP); Masahiro Hayashi, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 329 days.

(21) Appl. No.: 13/137,734

(22) Filed: Sep. 8, 2011

(65) Prior Publication Data

US 2012/0069390 A1 Mar. 22, 2012

(30) Foreign Application Priority Data

Sep. 16, 2010 (JP) ................. 2010-208475

(51) Int. Cl.
*G06K 15/00* (2006.01)
*G06F 3/12* (2006.01)
*H04N 1/21* (2006.01)

(52) U.S. Cl.
USPC ....... 358/1.15; 358/1.14; 358/1.16; 358/1.18; 358/296

(58) Field of Classification Search
USPC ............... 358/1.15, 1.2, 1.13, 1.14, 1.16, 1.1, 358/1.18, 1.9, 501, 508, 537, 401, 426.05, 358/296; 709/201, 212, 213, 217, 238, 246, 709/250; 710/8, 1, 100, 301; 707/600, 607, 707/609, 627, 661, 662, 663, 665, 669, 692, 707/705, 721, 769, 770, 821
See application file for complete search history.

(56) References Cited

U.S. PATENT DOCUMENTS 6,611,347 B1 8/2003 Okada et al.
7,933,029 B2 * 4/2011 Tanaka .................. 358/1.13

(Continued)

FOREIGN PATENT DOCUMENTS

CN 1185607 6/1998
CN 1984211 6/2007

(Continued)

OTHER PUBLICATIONS

Takashiro, Print Data Accumulation Device, Feb. 19, 2009, Machine Translation Japanese Patent Publication , JP2009037409, All pages.*
Chinese Office Action and English translation thereof dated Oct. 23, 2013.

*Primary Examiner* — Ngon Nguyen
(74) *Attorney, Agent, or Firm* — Harness, Dickey & Pierce, P.L.C.

(57) ABSTRACT

An image forming apparatus includes a storage unit that stores therein print data and first converted data obtained by reflecting a first print condition in the print data and converting the print data into a printable form; an input receiving unit that receives an input of a reprint instruction to reprint the first converted data; an acquiring unit that acquires a second print condition for reprinting the first converted data; a determining unit that determines whether the first converted data is printable in the second print condition by comparing the acquired second print condition against the first print condition; a converting unit that converts, when it is determined that the first converted data is unprintable in the second print condition, the print data into second converted data by reflecting the second print condition in the print data; a print control unit prints out the second converted data.

11 Claims, 11 Drawing Sheets

(56) References Cited

U.S. PATENT DOCUMENTS 8,422,045 B2* 4/2013 Yamada .................. 358/1.14
2007/0133042 A1 6/2007 Park
2009/0109476 A1* 4/2009 Ando ...................... 358/1.15

FOREIGN PATENT DOCUMENTS

| CN | 101327695 | 12/2008 |
| JP | 2004-288032 A | 10/2004 |
| JP | 2009-037409 A | 2/2009 |

* cited by examiner

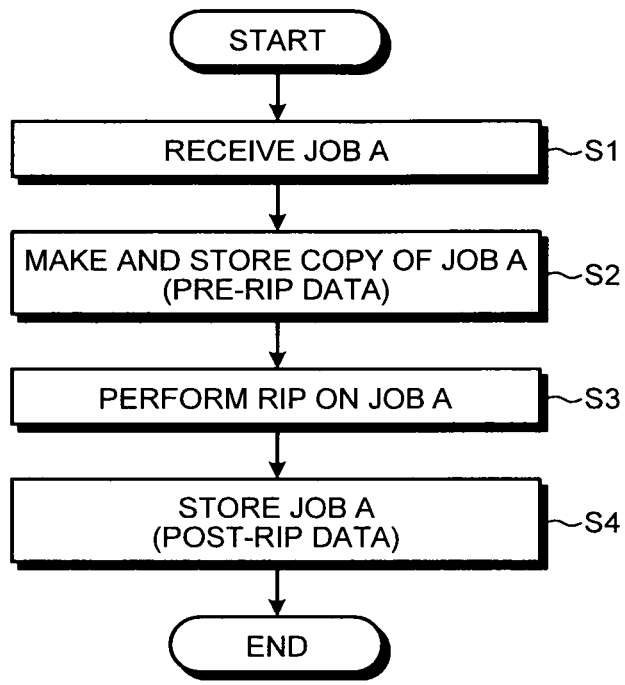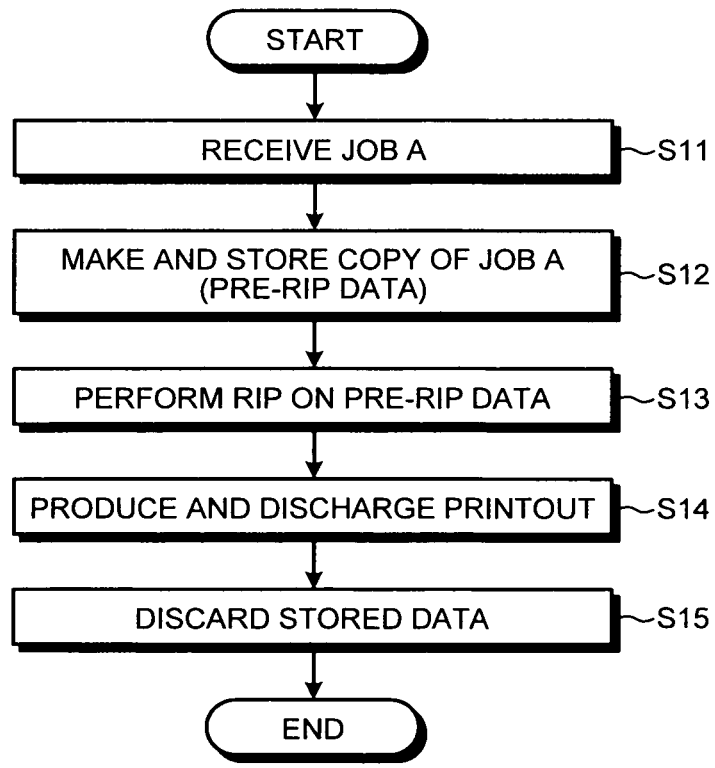

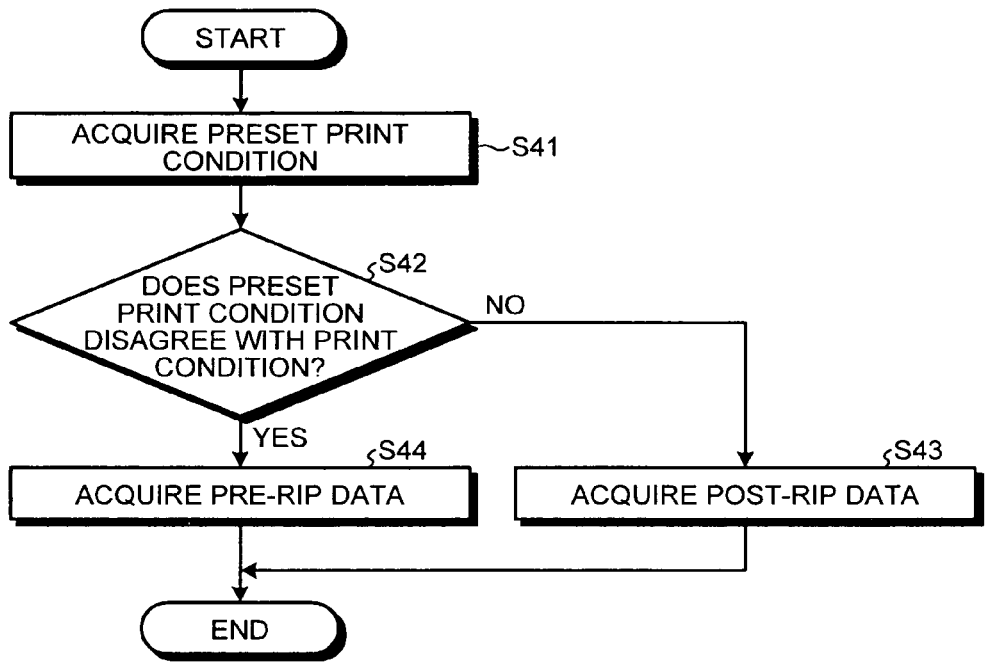
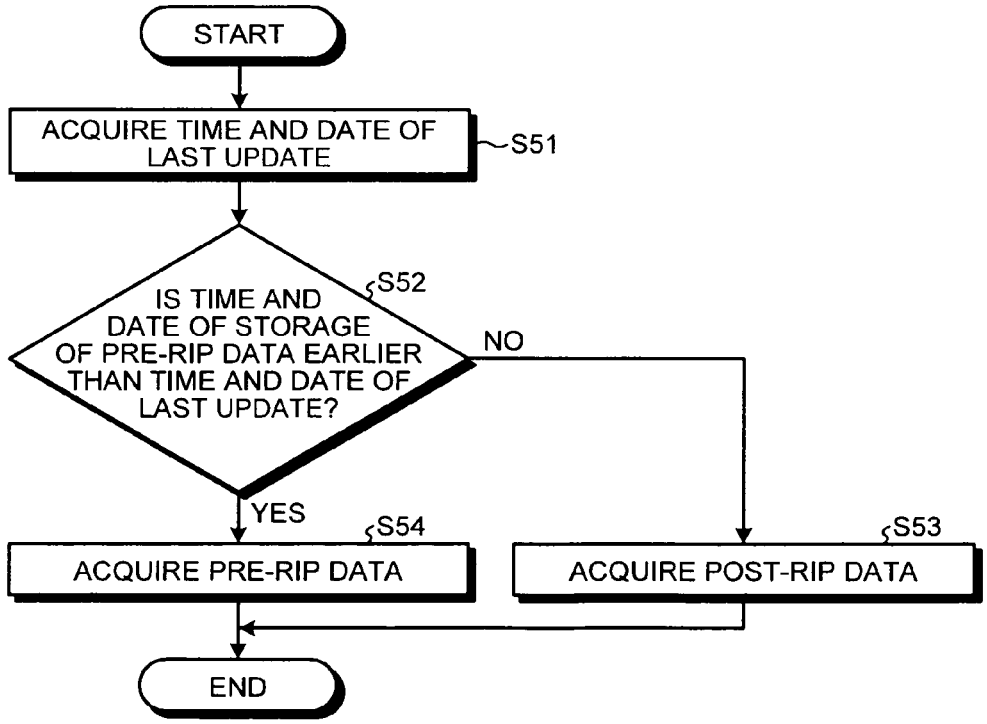

IMAGE FORMING APPARATUS, IMAGE FORMING METHOD, AND COMPUTER PROGRAM PRODUCT

CROSS-REFERENCE TO RELATED APPLICATIONS

The present application claims priority to and incorporates by reference the entire contents of Japanese Patent Application No. 2010-208475 filed in Japan on Sep. 16, 2010.

BACKGROUND OF THE INVENTION

1. Field of the Invention

The present invention relates to an image forming apparatus, an image forming method, and a computer program product.

2. Description of the Related Art

Techniques of converting print data described in page description language (PDL) or the like into converted data, which reflects print condition, in a printable form with a raster image processor (RIP) have been known in recent years. Meanwhile, methods of speeding up a printing process during reprinting by using converted data converted by an RIP are conventionally developed.

For example, a method of managing print data entities associated with contents of past print requests so that, in the case that a user performs reprinting of print data stored by the user when the user has performed printing or in the case that a user performs printing of print data stored by another user, the reprinting or the printing can be performed efficiently is disclosed (in, for example, Japanese Patent Application Laid-open No. 2009-037409).

A method of managing a print job as a print hold job when an out-of-supply condition is detected so that, even when printing of the print job is inhibited by occurrence of an error resulting from an out-of-paper, out-of-staple, out-of-ink error, or a like situation, the print job can be reprinted after resolution of the error is disclosed (in, for example, Japanese Patent Application Laid-open No. 2004-288032).

However, it is not possible by using the method disclosed in Japanese Patent Application Laid-open No. 2009-037409 to reflect, when reprinting a stored document, a change made to print-related condition of the document after the document has been stored, in the print-related condition. It is not possible by using the method disclosed in Japanese Patent Application Laid-open No. 2004-288032 to reflect, when reprinting a print hold job, a change made to print-related condition of the print hold job into the print-related condition.

The methods of Japanese Patent Application Laid-open No. 2009-037409 and Japanese Patent Application Laid-open No. 2004-288032 exhibit poor operability because, each time when reprinting is to be performed, the methods force a user to determine applicable conditions and set the conditions individually in order to reflect, in the condition, the change made after the document has been stored or after the print job has been stored. A configuration in which print condition is automatically and invariably set to the same print condition as those at a time of storage of the document or the print job can disadvantageously lead to degradation in image quality because the condition cannot be set to be suitable for equipment, by which the print data is to be output.

SUMMARY OF THE INVENTION

It is an object of the present invention to at least partially solve the problems in the conventional technology.

According to an aspect of the present invention, there is provided an image forming apparatus that includes a storage unit, an input receiving unit, an acquiring unit, a determining unit, a converting unit, and a print control unit. The storage unit stores therein print data and first converted data. The first converted data is obtained by reflecting a first print condition in the print data and converting the print data into a printable form. The input receiving unit receives an input of a reprint instruction to reprint the first converted data. The acquiring unit acquires a second print condition for reprinting the first converted data. The determining unit determines, when the input of the reprint instruction is received, whether the first converted data is printable in the second print condition by comparing the acquired second print condition against the first print condition reflected in the first converted data. When it is determined that the first converted data is unprintable in the second print condition, the converting unit acquires the print data from the storage unit, and converts the print data into second converted data by reflecting the second print condition in the print data. The print control unit prints out the second converted data.

According to another aspect of the present invention, there is provided an image forming method that includes storing print data and first converted data in a storage unit, the first converted data being obtained by reflecting a first print condition in the print data and converting the print data into a printable form; receiving an input of a reprint instruction to reprint the first converted data; acquiring a second print condition for reprinting the first converted data; determining, when the input of the reprint instruction is received, whether the first converted data is printable in the second print condition by comparing the acquired second print condition against the first print condition reflected in the first converted data; acquiring, when it is determined that the first converted data is unprintable in the second print condition acquired at the acquiring, the print data from the storage unit, and converting the print data into second converted data by reflecting the second print condition in the print data; and printing the second converted data.

According to still another aspect of the present invention, there is provided a computer program product comprising a non-transitory computer readable medium including programmed instructions. The instructions, when executed by a computer, cause the computer to perform: storing print data and first converted data in a storage unit, the first converted data being obtained by reflecting a first print condition in the print data and converting the print data into a printable form; receiving an input of a reprint instruction to reprint the first converted data; acquiring a second print condition for reprinting the first converted data; determining, when the input of the reprint instruction is received, whether the first converted data is printable in the second print condition by comparing the acquired second print condition against the first print condition reflected in the first converted data; acquiring, when it is determined that the first converted data is unprintable in the second print condition acquired at the acquiring, the print data from the storage unit, and converting the print data into second converted data by reflecting the second print condition in the print data; and printing the second converted data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a flowchart illustrating a procedure for a job storing process to be performed by an image forming apparatus;

FIG. 5 is a flowchart illustrating a procedure for a job printing process to be performed by the image forming apparatus;

FIG. 7 is a flowchart illustrating a first modification of the procedure for the print-data acquiring process to be performed by the print control unit;

FIG. 8 is a flowchart illustrating a second modification of the procedure for the print-data acquiring process to be performed by the print control unit;

DETAILED DESCRIPTION OF THE PREFERRED EMBODIMENTS

Exemplary embodiments of the present invention will be described in detail below with reference to the accompanying drawings.

Figure 1:
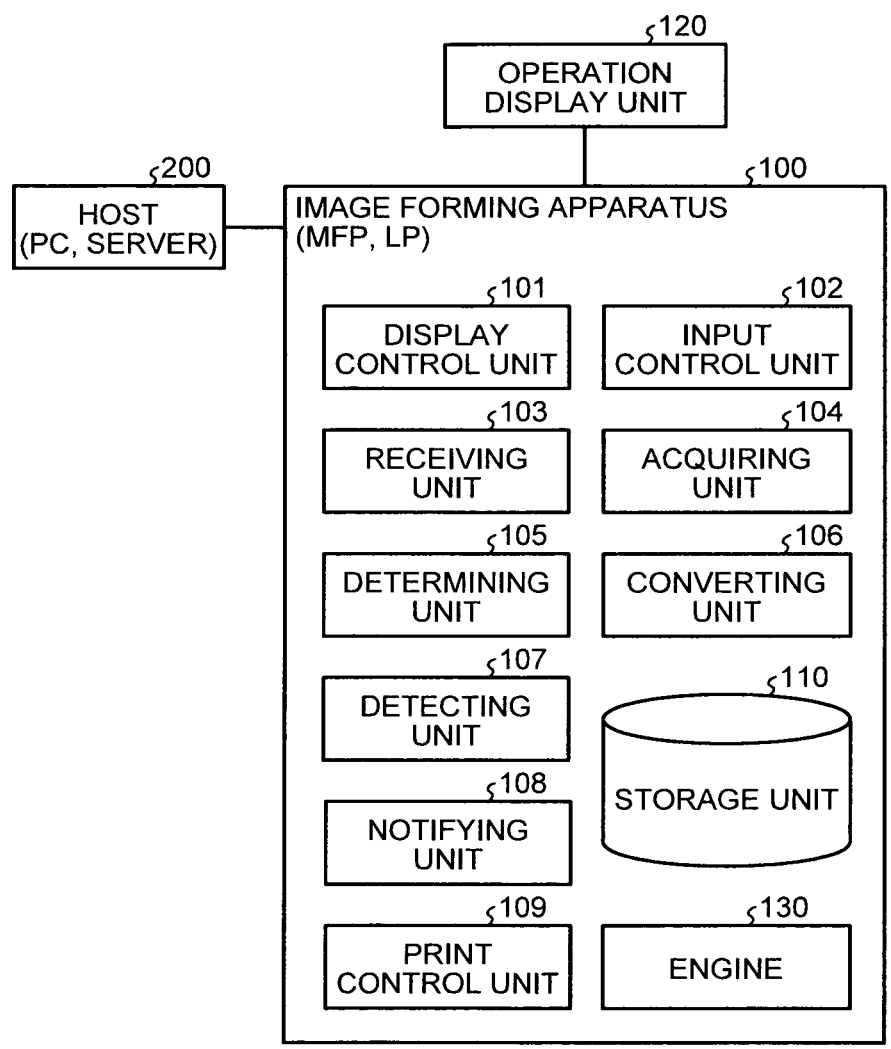
FIG. 1 is a block diagram illustrating the configuration of an image forming system according to an embodiment of the present invention.

FIG. 1 is a block diagram illustrating the configuration of an image forming system according to an embodiment of the present invention. As illustrated in FIG. 1, the image forming system includes a host 200, which is a personal computer (PC) or a server, and an image forming apparatus 100, which is a multifunction printer (MFP) or a laser printer (LP), that is connected to the host 200.

As illustrated in FIG. 1, the image forming apparatus 100 includes a display control unit 101, an input control unit 102, a receiving unit 103, an acquiring unit 104, a determining unit 105, a converting unit 106, a detecting unit 107, a notifying unit 108, a print control unit 109, an operation display unit 120, a storage unit 110, and an engine 130.

The receiving unit 103 receives print data from the host 200 and stores the received print data in the storage unit 110. The print data is image data to be printed; the print data may include images and texts.

The display control unit 101 displays various types of information to be displayed on the operation display unit 120. The display control unit 101 displays, for example, a print completion notification and an error notification on the operation display unit 120.

The input control unit 102 has functions as an input receiving unit and a print-condition receiving unit of the present invention and receives various types of inputs entered by a user. For example, the input control unit 102 receives inputs of a print condition, a preset print condition, a reprint instruction, a forced print instruction, and the like.

Note that the print condition is a condition to be set for printing print data. Examples of the print condition include color mode, the number of sheets to be printed on one sheet in multiple-up printing, and duplex printing.

The preset print condition is a print condition set for each of users. Examples of the preset print condition include eco-friendly condition. The eco-friendly condition has been set in advance as a condition for saving resources to be consumed in printing. The eco-friendly condition is at least any one of multiple-up printing, duplex printing, and toner-saving printing. Note that these are only examples of the eco-friendly condition and the eco-friendly condition can be any condition that can reduce the resources.

The reprint instruction is an instruction to reprint converted data already stored in the storage unit 110. The print data already stored in the storage unit 110 may either post-RIP data that is print data stored when a user other than a user who has entered the reprint instruction has performed printing in the past, or post-RIP data that is stored print data, printing of which has been attempted by the user who has entered the reprint instruction but failed.

The forced print instruction is an instruction instructing to forcibly resume printing that is put on hold because it is determined that, if the converted data is printed, an error that leads to suspension of printing will occur in equipment.

The acquiring unit 104 acquires a print condition for reprinting the converted data. For example, the acquiring unit 104 acquires a print condition stored in the storage unit 110 as the print condition for reprinting the converted data.

The print condition to be acquired by the acquiring unit 104 is desirably information, based on which the determining unit 105, which will be described later, can determine whether it is possible to print the converted data in the print condition for reprinting the converted data by comparing the print condition for reprinting the converted data against the print condition stored in the storage unit 110. Accordingly, the acquiring unit 104 acquires, as the print condition for reprinting the converted data, a permitted print condition, a preset print condition, time and date of storage of the print data, time and date of update of the print condition, and the like stored in the storage unit 110.

When the input control unit 102 receives an input of a reprint instruction, the determining unit 105 compares the print condition for reprinting the converted data against the print condition reflected in the converted data to determine whether the converted data is printable in the print condition for reprinting the converted data.

For example, when monochrome printing is set as the permitted print condition stored in the storage unit 110, while color printing is set as the print condition reflected in the converted data, the determining unit 105 determines that the converted data, which reflects the print condition of color printing, is unprintable in the permitted print condition of monochrome printing. Meanwhile, information about which print condition is permitted according to the permitted print condition is stored in the storage unit 110 in advance.

When the permitted print condition stored in the storage unit 110 is eco-friendly condition, the determining unit 105 determines whether the print condition reflected in the converted data is the eco-friendly condition.

For example, in a case where no-multiple-up printing is set as the print condition reflected in the converted data, while multiple-up printing is designated as the eco-friendly condition, the print condition reflected in the converted data does not agree with the print condition designated as the eco-friendly condition. In this case, the determining unit 105 determines that the converted data is unprintable in the print condition for reprinting the converted data.

Furthermore, the determining unit 105 compares time and date when the print data acquired by the acquiring unit 104 is stored against time and date when the print condition is updated so as to determine whether the time and date of update of the print condition is later than the time and date of storage of the print data. When it is determined that the time and date when the print condition is updated is later than the time and date when the print data is stored, the determining unit 105 determines that the converted data is unprintable in the print condition for reprinting the converted data.

For example, there may arise a situation that although stapling function is included as the print condition at a time when print data is stored, the stapling function is cancelled because of replacement of equipment. In such a situation, the determining unit 105 determines that the converted data reflecting the print condition (with stapling) is unprintable because the time and date when the print condition (without stapling) is updated is later than time and date of storage of the print data. Meanwhile, each of the time and date of storage and the time and date of update may be either information indicating only date or information indicating not only date but also time; any information that allows determination which one is later can be used.

Furthermore, the determining unit 105 determines whether, when printing of the converted data is performed in the print condition for reprinting the converted data, the printing will be suspended due to occurrence of an error. When the determining unit 105 determines that the printing will be suspended, the determining unit 105 determines that the converted data is unprintable in the print condition for reprinting the converted data.

For example, there can arise such a situation that although color printing is set as the print condition and the converted data is for 30 sheets, toner level of a color toner tank mounted on the image forming apparatus 100 is only for 2 sheets. In such a situation, the determining unit 105 determines that the converted data reflecting the print condition (color printing for 30 sheets) is unprintable according to the print condition for reprinting the converted data (color printing for 2 sheets).

The detecting unit 107 detects a change in equipment status. The equipment status is status of the image forming apparatus 100. Examples of the equipment status include adding toner to a toner tank, loading sheets into a paper feed tray, adding staples of a stapler, and receiving a change to a print condition.

Furthermore, the detecting unit 107 may detect a change to the print condition received by the input control unit 102 as a change in equipment status.

The notifying unit 108 provides a user with an error notification when it is determined that printing in the print condition stored in the storage unit 110 will be stopped due to an error. For example, the notifying unit 108 displays an error notification via the display control unit 101 on the operation display unit 120. A configuration in which the input control unit 102 receives a change to the print condition concurrent with provision of the error notification to the user by the notifying unit 108 can be employed. Note that receiving the change to the print condition is not necessarily concurrent with the error notification but can be after the error notification or the like timing.

The converting unit 106 converts the print data into a printable form with the RIP by reflecting the print condition in the print data, so as to generate converted data. For example, the converting unit 106 converts print data (hereinafter, referred as to "pre-RIP data") described in page description language (PDL), which is one of page description languages, into converted data (hereinafter, "post-RIP data") that is bitmapped image data.

Furthermore, when the determining unit 105 determines that printing will be suspended due to an error, the converting unit 106 does not convert the pre-RIP data but stores the pre-RIP data as not-yet-processed print data in a print-job management area, which will be described later, in the storage unit 110.

Furthermore, when the detecting unit 107 has detected an input of a change of a print condition received via the input control unit 102 as a change in equipment status, the converting unit 106 converts the pre-RIP data into post-RIP data by reflecting the changed print condition in the pre-RIP data.

The storage unit 110 stores therein various types of information. For example, the storage unit 110 stores therein print data received at the receiving unit 103 and pre-RIP data obtained by scanning by a scanner (not shown). The storage unit 110 also stores therein post-RIP data converted by the converting unit 106.

Figure 2:
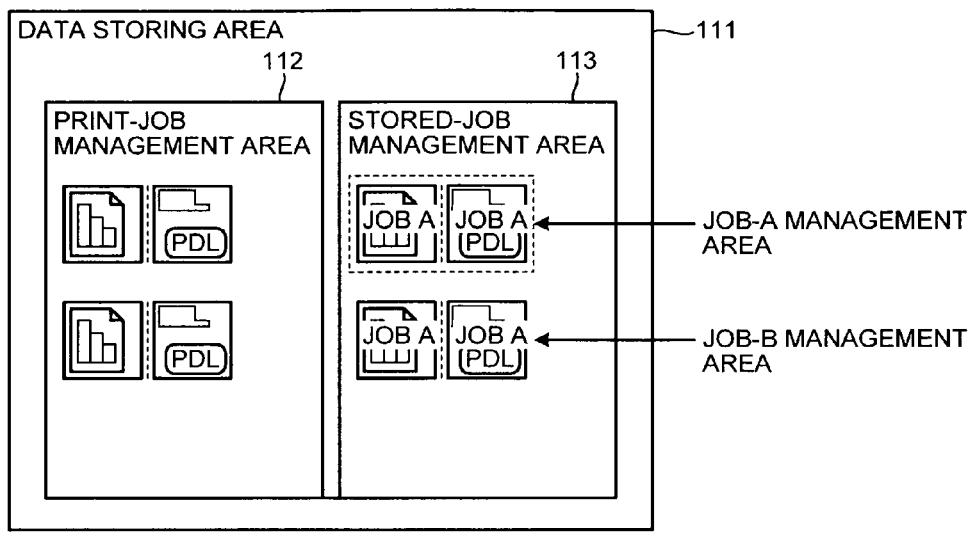
FIG. 2 is a diagram illustrating, in detail, an exemplary storage area in a storage unit according to the embodiment.

FIG. 2 is a diagram illustrating an exemplary storage area in the storage unit 110 according to this embodiment. As illustrated in FIG. 2, in the storage unit 110, a portion of the storage area is allocated to a data storing area 111. Note that, as illustrated in FIG. 2, the data storing area 111 includes a print-job management area 112 and a stored-job management area 113. Pre-RIP data and post-RIP data are stored in the data storing area 111.

The print-job management area 112 is an area for managing post-RIP data, which is not yet printed, associated with pre-RIP data. The stored-job management area 113 is an area, in which printed post-RIP data associated with pre-RIP data is stored as a stored job that is to be reprinted. As indicated by arrows in FIG. 2, a job-A management area and a job-B management area are partitioned in the stored-job management area 113. In the job-A management area in a broken line box, the post-RIP data on the left-hand side in the broken-line box and the pre-RIP data on the right-hand side are arranged side by side.

Figure 3:
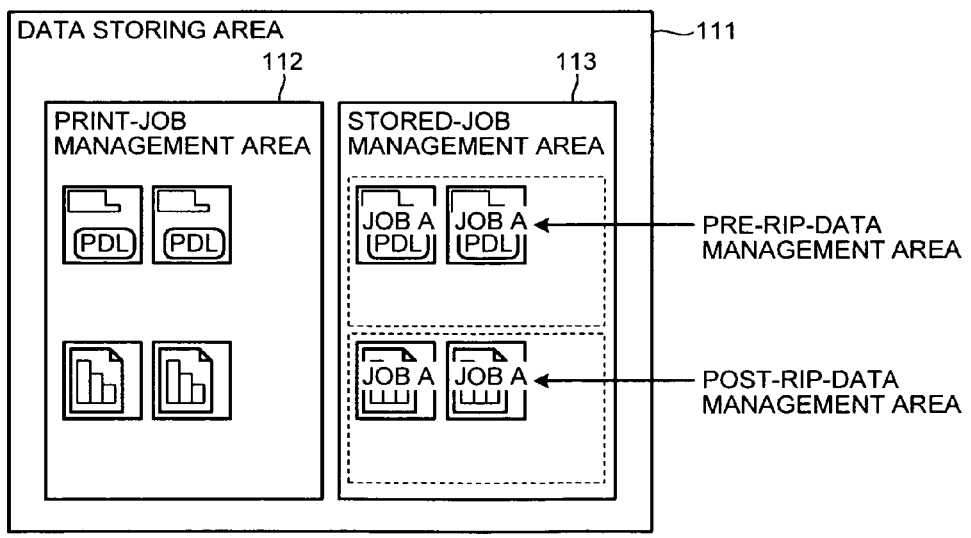
FIG. 3 is a diagram illustrating, in detail, an exemplary storage area in a conventional storage unit.

FIG. 3 is a diagram illustrating, in detail, an exemplary storage area in a conventional storage unit. As illustrated in FIG. 3, the conventional storage unit 110 stores post-RIP data and pre-RIP data separately in each of the print-job management area and the stored-job management area. For example, in the stored-job management area, each of the pre-RIP-data management area and the post-RIP-data management area is in a dotted line box. In short, the pre-RIP data and the post-RIP data stored in the conventional storage unit are not associated with each other.

The storage unit 110 also stores therein a permitted print condition, a preset print condition, and their respective corresponding print conditions. For example, when monochrome printing is permitted, the storage unit 110 stores therein, as a color mode use of which is permitted, monochrome printing so as to be associated with the permitted print condition. When use of color printing is permitted, the storage unit 110 stores therein, as color modes use of which are permitted, monochrome printing and color printing so as to be associated with the permitted print condition. Meanwhile, the storage unit 110 also stores therein a concrete print condition so as to be associated with the preset print condition in a similar manner. Examples of the preset print condition includes various print conditions to be set by a user, such as a condition for superimposition printing of superimposing an RGB image, such as a watermark and an embedded pattern.

The print control unit 109 acquires the pre-RIP data or the post-RIP data converted by the converting unit 106 from the storage unit 110, transmits the acquired post-RIP data to the engine 130, and causes the engine 130 to print the post-RIP data. The print control unit 109 also causes the post-RIP data to be printed when the detecting unit 107 has detected a change in equipment status. For example, when the detecting unit 107 has detected addition of toner or a change to the print condition as a change in equipment status, the print control unit 109 causes the post-RIP data to be printed.

Furthermore, when an input of a forced print instruction is received, the print control unit 109 changes the print condition stored in the storage unit 110 to a condition that allow avoiding an error, and causes the post-RIP data to be printed in the changed condition.

The engine 130 receives the converted data from the print control unit 109, produces a printout of the received converted data, and discharges the printout.

A procedure for a job storing process to be performed by the image forming apparatus 100 configured as described above will be described below. FIG. 4 is a flowchart illustrating the procedure for the job storing process to be performed by the image forming apparatus 100.

The receiving unit 103 receives pre-RIP data of the job A (Step S1). The receiving unit 103 makes a copy of the job A and stores the copy of the pre-RIP data in the job-A management area in the stored-job management area 113 in the storage unit 110 (Step S2).

The converting unit 106 performs raster image processing on the pre-RIP data of the job A, thereby obtaining post-RIP data (Step S3). The converting unit 106 stores the post-RIP data in the job-A management area in the stored-job management area 113 in the storage unit 110 (Step S4).

Next, a procedure for a job printing process to be performed by the image forming apparatus 100 will be described below. FIG. 5 is a flowchart illustrating the procedure for the job printing process to be performed by the image forming apparatus 100.

Processing from Step S11 to Step S13 is similar to that from Step S1 to Step S3 in the flowchart of FIG. 4 illustrating the procedure for the job storing process.

At Step S14, the print control unit 109 acquires the post-RIP data from the storage unit 110 and causes the engine 130 to produce and discharge a printout of the acquired post-RIP data (Step S14). The print control unit 109 discards the pre-RIP data and the post-RIP data from the stored-job management area 113 (Step S15).

Figure 6:
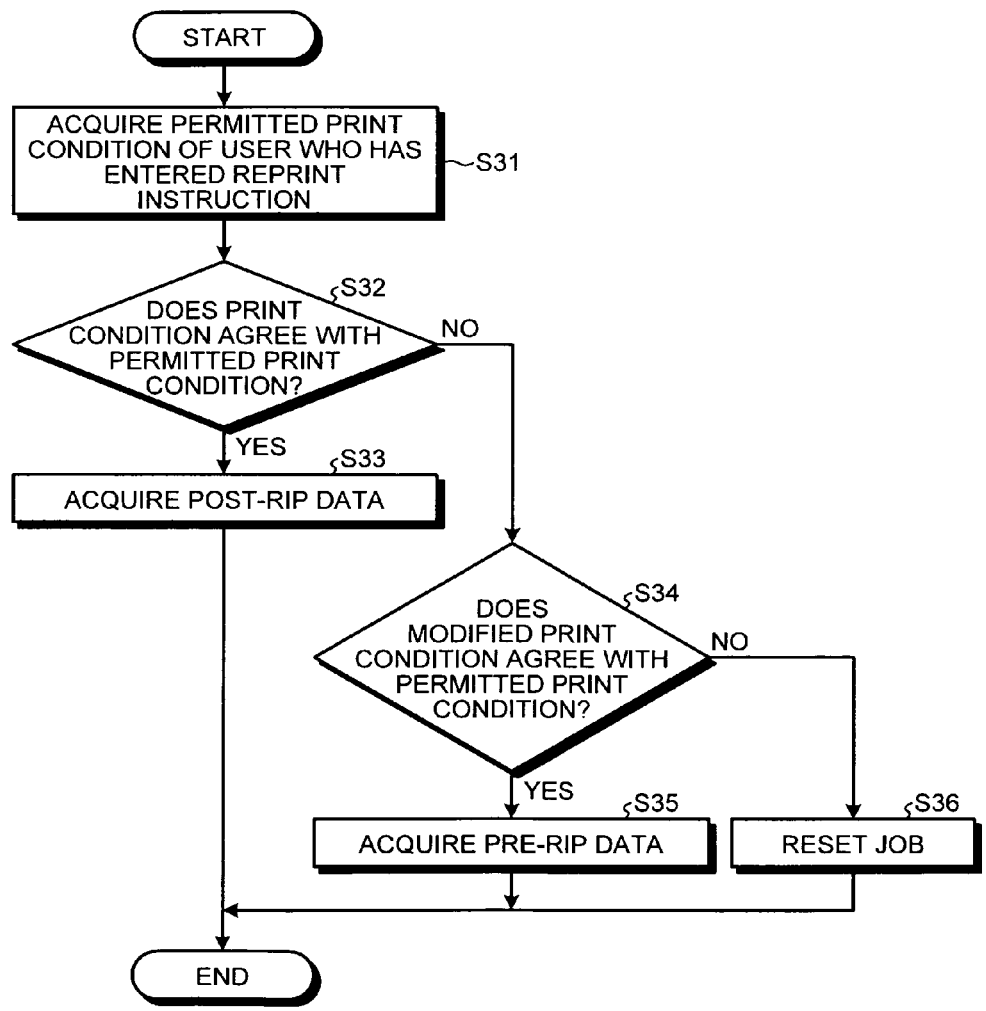
FIG. 6 is a flowchart illustrating a procedure for a print-data acquiring process to be performed by a print control unit.

A procedure for a print-data acquiring process to be performed by the print control unit 109 will be described below. FIG. 6 is a flowchart illustrating the procedure for the print-data acquiring process to be performed by the print control unit 109.

The acquiring unit 104 acquires a permitted print condition of a user who has entered a reprint instruction (Step S31). For example, the acquiring unit 104 acquires, from the storage unit 110, a permitted print condition associated with a user ID, input of which has been received in conjunction with the reprint instruction.

The determining unit 105 determines whether a print condition for reprinting the post-RIP data agrees with the permitted print condition (Step S32). For example, the determining unit 105 determines whether use of the print condition reflected in the post-RIP data is permitted according to the permitted print condition associated therewith (Step S32).

In a case in which the determining unit 105 determines that the print condition agrees with the permitted print condition (YES at Step S32), the print control unit 109 acquires the post-RIP data from the storage unit 110 (Step S33). Examples of the case include a case in which color printing is set as the permitted print condition, and color printing is set as the print condition reflected in the post-RIP data.

When the determining unit 105 determines that the print condition does not agree with the permitted print condition (NO at Step S32), the determining unit 105 further determines whether modifying the print condition causes the print condition to agree with the permitted print condition (Step S34).

In a case in which the determining unit 105 determines that modifying the print condition causes the print condition to agree with the permitted print condition (YES at Step S34), the determining unit 105 acquires the pre-RIP data (Step S35). Examples of the case include a case in which monochrome printing is set as the permitted print condition, while color printing is set as the print condition reflected in the post-RIP data. In this case, the determining unit 105 determines that modifying the print condition from color printing to monochrome printing causes the print condition to agree with the permitted print condition.

In a case in which the determining unit 105 determines that even the print condition that is modified does not agree with the permitted print condition (NO at Step S34), the determining unit 105 resets the job (Step S36). Examples of the case include a case in which a user identified by the user ID that has been entered in conjunction with the reprint instruction has no authority to perform printing by using the image forming apparatus 100.

Next, two modifications (first modification and second modification) of the procedure for the print-data acquiring process to be performed by the print control unit 109 will be described below. The first modification of the procedure for the print-data acquiring process to be performed by the print control unit 109 will be described below. FIG. 7 is a flowchart illustrating the first modification of the procedure for the print-data acquiring process to be performed by the print control unit 109.

The determining unit 105 acquires the preset print condition from the storage unit 110 (Step S41). The determining unit 105 determines whether the preset print condition disagrees with the print condition for reprinting the post-RIP data (Step S42).

When the determining unit 105 determines that the preset print condition does not disagree with the print condition for reprinting the post-RIP data (NO at Step S42), the print control unit 109 acquires the post-RIP data (Step S43). In contrast, when the determining unit 105 determines that the preset print condition disagrees with the print condition for reprinting the post-RIP data (YES at Step S42), the print control unit 109 acquires the pre-RIP data (Step S44).

The second modification of the procedure for the print-data acquiring process to be performed by the print control unit 109 will be described below. FIG. 8 is a flowchart illustrating the second modification of the procedure for the print-data acquiring process to be performed by the print control unit 109.

The determining unit 105 acquires time and date of update of the print condition from the storage unit 110 (Step S51). The determining unit 105 determines whether the time and date of storage of the pre-RIP data is earlier than the time and date of update of the print condition (Step S52).

When the determining unit 105 determines that the time and date of storage of the pre-RIP data is later than the time and date of update of the print condition (NO at Step S52), the print control unit 109 acquires the post-RIP data (Step S53).

When the determining unit 105 determines that the time and date of storage of the pre-RIP data is earlier than the time and date of update of the print condition (YES at Step S52), the print control unit 109 acquires the pre-RIP data (Step S54).

Figure 9:
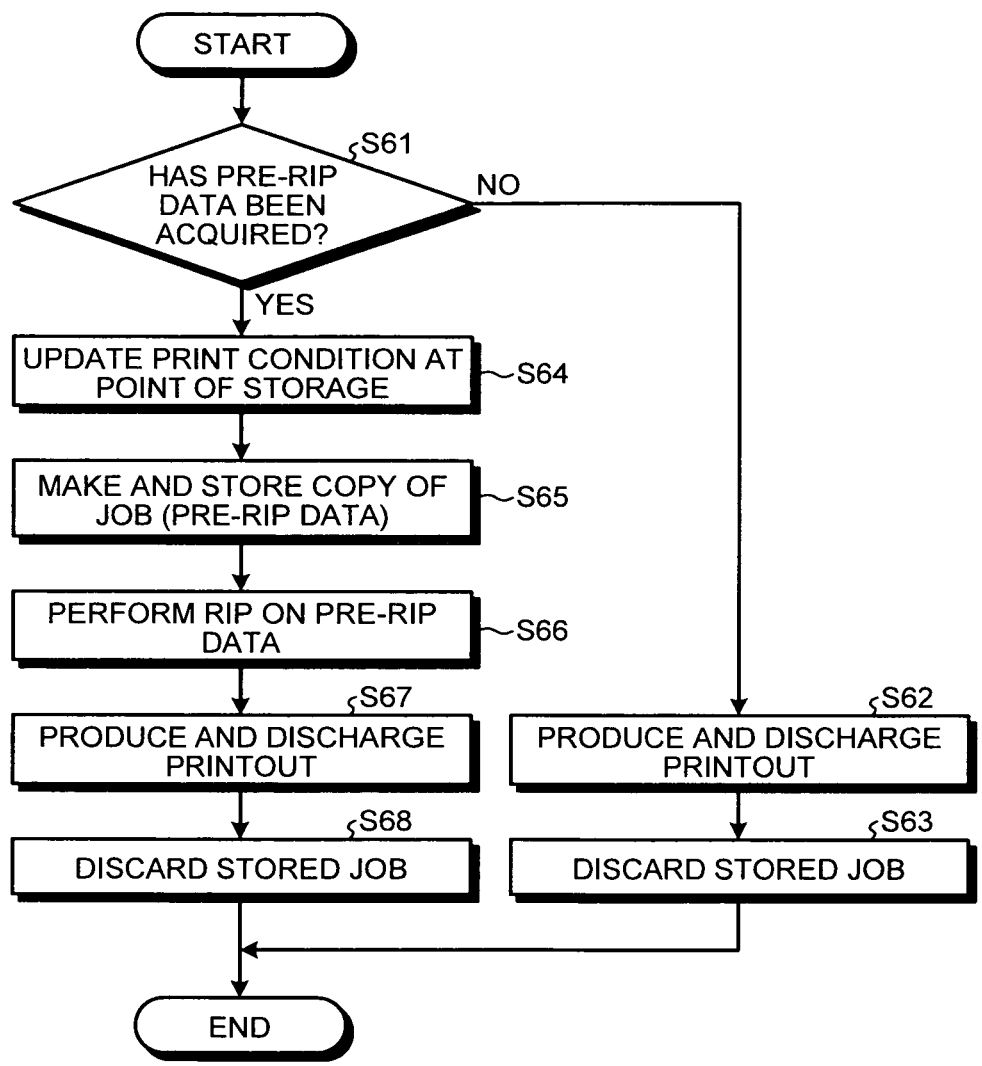
FIG. 9 is a flowchart illustrating a procedure for a stored-job printing process to be performed by the print control unit.

A procedure for a stored-job printing process for printing a stored job to be performed by the print control unit 109 will be described below. FIG. 9 is a flowchart illustrating the procedure for the stored-job printing process to be performed by the print control unit 109.

The print control unit 109 determines whether the print control unit 109 has acquired the pre-RIP data or the print control unit 109 has acquired the post-RIP data in the print-data acquiring process (Step S61). When the print control unit 109 determines that the print control unit 109 has acquired the post-RIP data (NO at step S61), the print control unit 109 causes the engine 130 to produce and discharge a printout of the post-RIP data acquired from the storage unit 110 (Step S62). The print control unit 109 discards the stored job from the stored-job management area 113 in the storage unit 110 (Step S63).

At Step S61, when the print control unit 109 determines that the print control unit 109 has acquired the pre-RIP data (YES at Step S61), the print control unit 109 updates the print condition at a point of storing to the print condition for reprinting (Step S64).

The print control unit 109 makes a copy of the pre-RIP data and stores the copy of the pre-RIP data in the stored-job management area 113 in the storage unit 110 (Step S65). The converting unit 106 performs raster image processing on the pre-RIP data (Step S66).

The print control unit 109 causes the engine 130 to produce and discharge a printout of the post-RIP data (Step S67). The print control unit 109 discards the stored job from the stored-job management area 113 in the storage unit 110 (Step S68).

Figure 10:
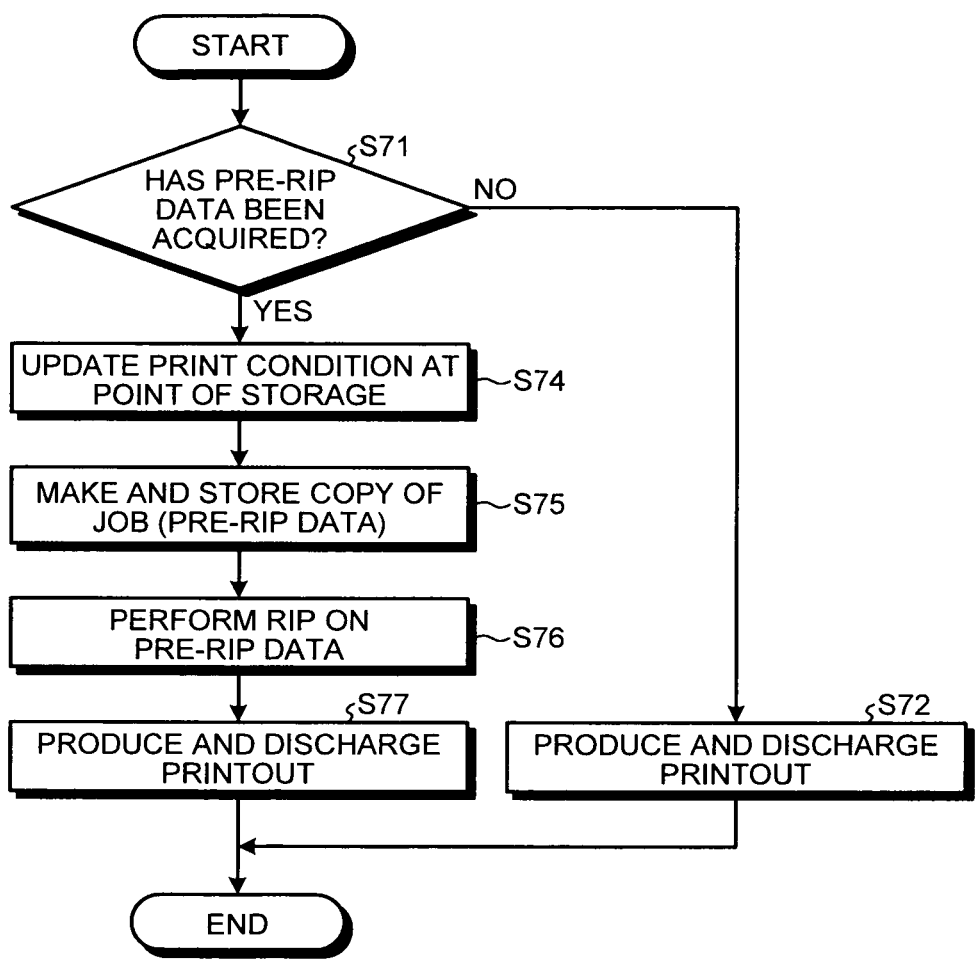
FIG. 10 is a flowchart illustrating a modification of the procedure for the stored-job printing process to be performed by the print control unit.

A modification of the procedure for the stored-job printing process for printing a stored job to be performed by the print control unit 109 will be described below. FIG. 10 is a flowchart illustrating the modification of the procedure for the stored-job printing process to be performed by the print control unit 109.

Processing of Step S71 and Step S72 is similar to that of Step S61 and Step S62 of the stored-job printing process illustrated in FIG. 9. Processing from Step S74 to Step S77 is similar to that from Step S64 to Step S67 of the stored-job printing process illustrated in FIG. 9.

In the modification, processing of Step S63 and Step S68 of the stored-job printing process illustrated in FIG. 9 is not performed. Put another way, after the engine 130 has produced and discharged the printout of the post-RIP data, the print control unit 109 may or may not discard the stored job from the stored-job management area 113 in the storage unit 110.

Figure 11:
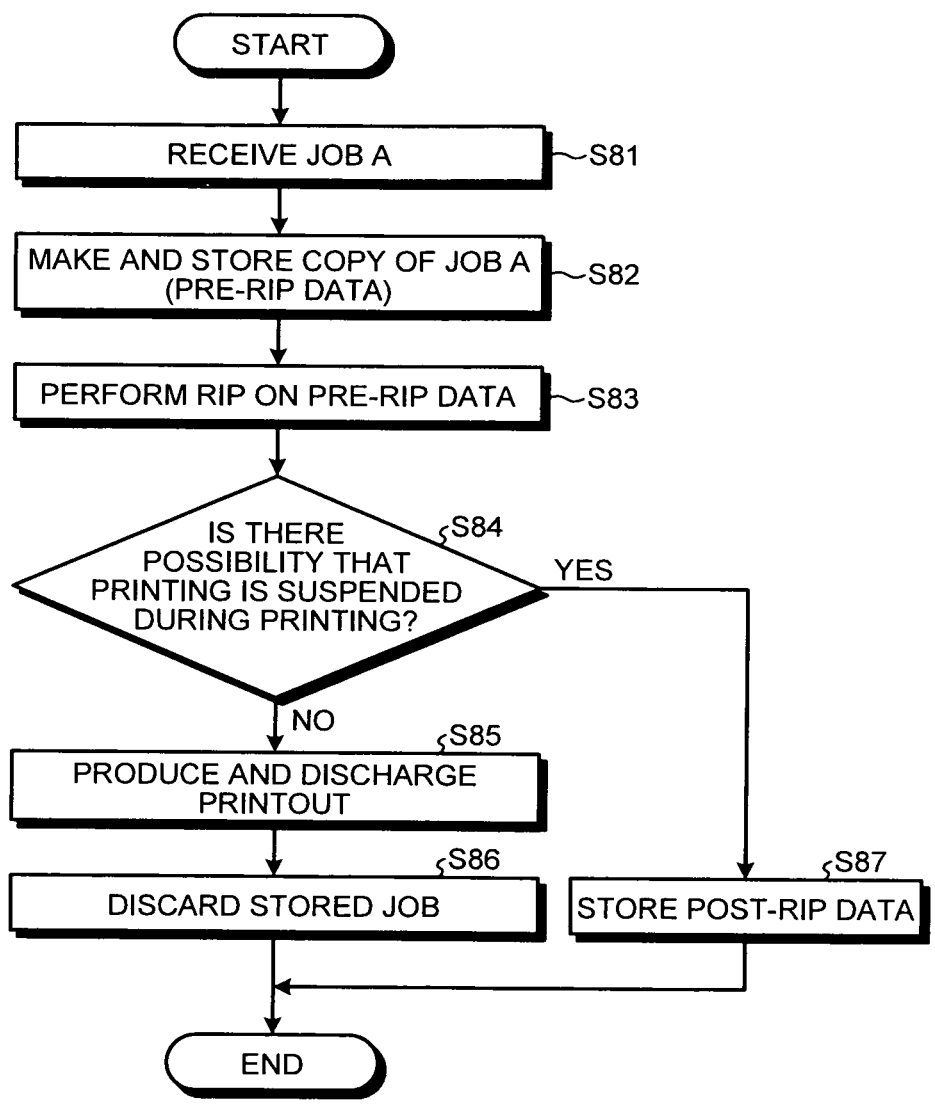
FIG. 11 is a flowchart illustrating a procedure for a job holding process.

A procedure for a job holding process will be described below. FIG. 11 is a flowchart illustrating the procedure for the job holding process.

Processing from Step S81 to Step S83 is similar to that from Step S11 to Step S13 of the job printing process illustrated in FIG. 5.

At Step S84, the determining unit 105 determines whether there is a possibility that printing is suspended during printing (Step S84). For example, the determining unit 105 compares the equipment status and the print condition reflected in the post-RIP data to determine whether any one of paper-feed tray not installed, out of paper, no appropriate tray, tray mismatch, duplex-printing-inapplicable tray selected, out of toner, finishing unavailable, discharge tray full, and the like situations will arise during printing.

Meanwhile, no appropriate tray is a situation where although an automatic tray selection mode is selected, there is no tray appropriate for a document size. Tray mismatch is a situation where, in a case in which a tray is selected, the selected tray is out of paper or paper of appropriate sheet size is not loaded in the selected tray.

Duplex-printing-inapplicable tray selected is a situation where, in a case in which a duplex-printing-inapplicable tray, which is a tray having been designated as inapplicable to duplex printing in advance, is provided, duplex printing and the duplex-printing-inapplicable tray are selected. Out of toner includes out of color toner and out of monochrome toner.

Finishing unavailable includes out of staples, staples full, breakdown of stapling unit, stapling resource busy, stapling-inapplicable paper on stapling tray, no appropriate size for selected stapling position, breakdown of punching unit, no appropriate size for selected punching position, and the like situations.

When it is determined that there is no possibility that printing is suspended during printing (NO at Step S84), the print control unit 109 produces a printout of the post-RIP data, and discharge the printout (Step S85). The print control unit 109 discards the stored job from the stored-job management area 113 in the storage unit 110 (Step S86).

When it is determined that there is a possibility that printing is suspended during printing (YES at Step S84), the print control unit 109 stores the post-RIP data of the job A (Step S87). That is, the job A is put on hold.

Figure 12:
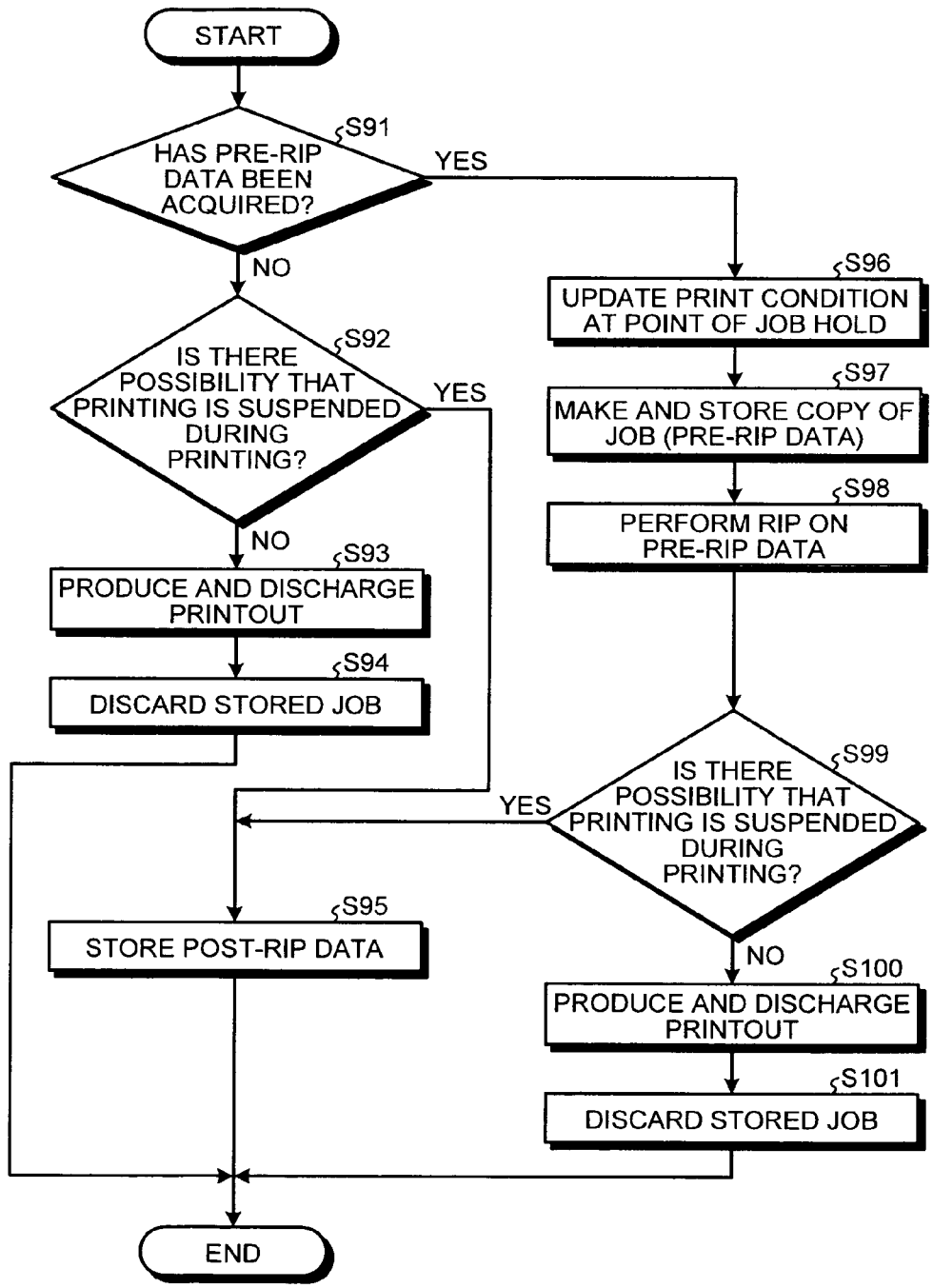
FIG. 12 is a flowchart illustrating a procedure for a process of automatically resuming a print hold job.

A procedure for a process of automatically resuming a print hold job will be described below. FIG. 12 is a flowchart illustrating the procedure for the process of automatically resuming a print hold job.

The process described below is triggered by, after a job is put on hold by the print control unit 109, detection of a change in equipment status by the detecting unit 107. For example, when the detecting unit 107 detects addition of toner as a change in equipment status in a situation where a job is put on hold because it is determined that printing will be suspended during printing due to out of toner, the process starts.

For another example, immediately after a job is put on hold by the print control unit 109 or after a lapse of a predetermined period after a job is put on hold by the print control unit 109, the process described below starts.

The determining unit 105 determines whether the pre-RIP data is acquired or the post-RIP data is acquired (Step S91). When the determining unit 105 determines that the post-RIP data is acquired (NO at Step S91), the determining unit 105 determines whether there is a possibility that printing is suspended during printing (Step S92).

When the determining unit 105 determines that there is no possibility that printing is suspended during printing (NO at Step S92), the print control unit 109 causes the engine 130 to produce and discharge a printout of the post-RIP data (Step S93). The print control unit 109 discards the stored job from the stored-job management area 113 in the storage unit 110 (Step S94).

When it is determined that there is a possibility that printing is suspended during printing (YES at Step S92), the print control unit 109 stores the post-RIP data of the job in the stored-job management area 113 in the storage unit 110 (Step S95).

At Step S91, when the determining unit 105 determines that the print control unit 109 has acquired the pre-RIP data (YES at Step S91), the print control unit 109 updates the print condition at a point in time of job hold to the print condition for resuming the job (Step S96).

Processing of Step S97 and Step S98 is similar to that of Step S75 and Step S76 of the stored-job printing process in the flowchart illustrated in FIG. 10.

At Step S99, the determining unit 105 determines whether there is a possibility that printing is suspended during printing (Step S99). When the determining unit 105 determines that there is a possibility that printing is suspended during printing (YES at Step S99), the print control unit 109 performs processing of Step S95 (Step S95).

When the determining unit 105 determines that there is no possibility that printing is suspended during printing (NO at Step S99), the print control unit 109 causes the engine 130 to produce and discharge a printout of the post-RIP data (Step S100). The print control unit 109 discards the stored job from the stored-job management area 113 in the storage unit 110 (Step S101).

Figure 13:
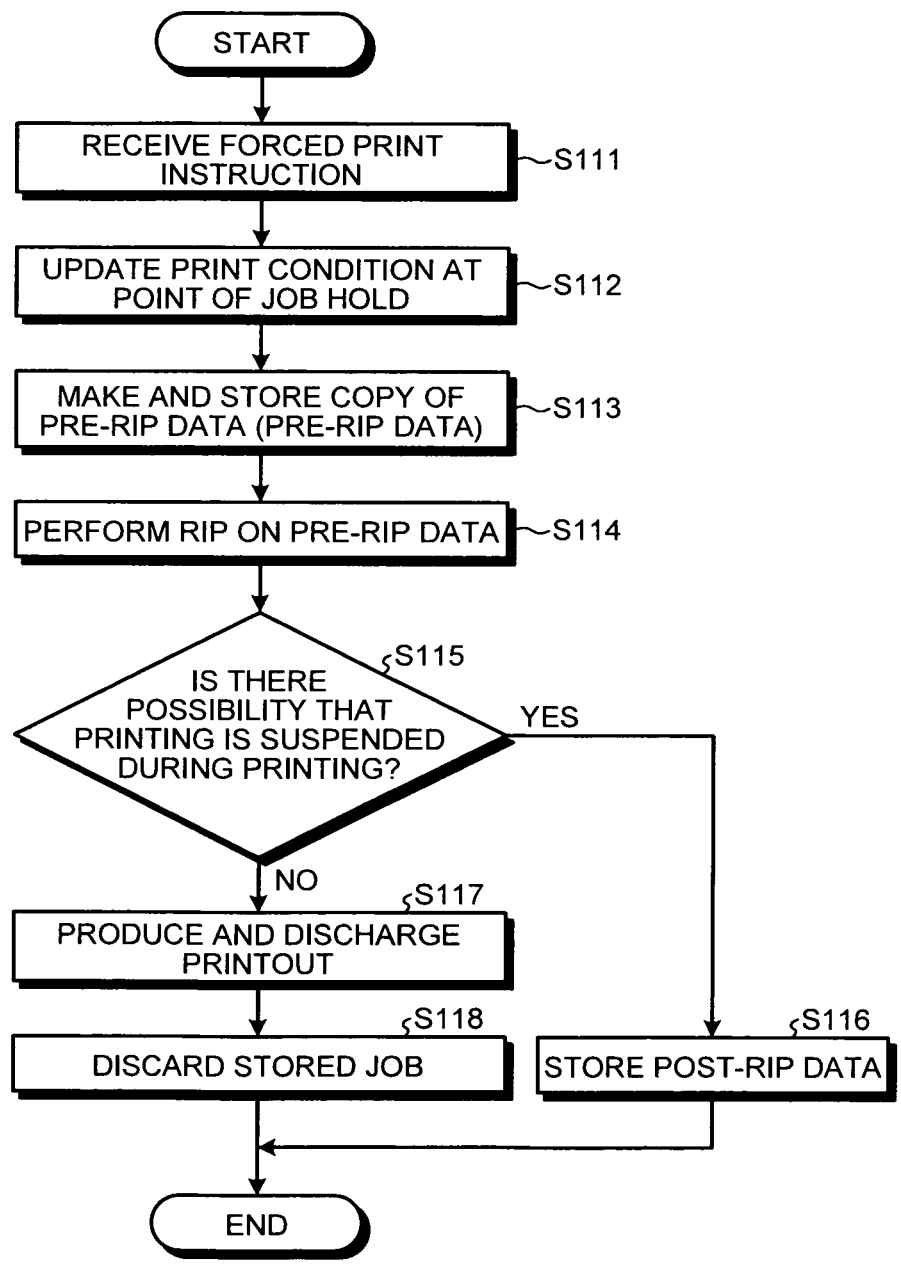
FIG. 13 is a flowchart illustrating a procedure for a process of forcibly resuming a print hold job.

A procedure for a process of forcibly resuming a print hold job will be described below. FIG. 13 is a flowchart illustrating the procedure for the process of forcibly resuming a print hold job.

The input control unit 102 receives an input of a forced print instruction entered by a user (Step S111). At this point, the input control unit 102 receives an input of a change to the print condition in conjunction with the input of the forced print instruction.

Processing from Step S112 to Step S118 is similar to that from Step S96 to Step S101 in the flowchart of FIG. 12 illustrating the procedure for the process of automatically resuming a print hold job.

As described above, according to the embodiment, whether the converted data (the post-RIP data) reflecting print condition at a point of storing is printable in a print condition for reprinting is determined, and, when the converted data is determined to be unprintable, the print data (pre-RIP data) is converted again into converted data reflecting an appropriate print condition. Accordingly, reprinting as intended by a user can be performed without sacrificing image quality and operability.

Furthermore, according to the embodiment, it is possible to reprint stored print data in a print condition for reprinting, which is different from a print condition at the point of storing the print data. For example, it is possible to set, as the print condition for reprinting, the eco-friendly condition that has not been set at the point of storing print data. Accordingly, even when resource-saving printing is not performed at the point of storing, it is possible to save resources at reprinting.

Furthermore, according to the embodiment, as described above, when a user with limited permission to use print conditions has selected a print condition use of which is not permitted, the print condition can be changed to a print condition use of which is permitted. Therefore, according to the embodiment, it is possible to perform printing in the permitted print condition reliably.

Furthermore, according to the embodiment, whether printing will be suspended during printing due to occurrence of an error is determined. When it is determined that the printing will be suspended, the converted data is stored and the printing is put on hold, and the printing is resumed after resolution of the error. Accordingly, reprinting can be performed reliably.

Figure 14:
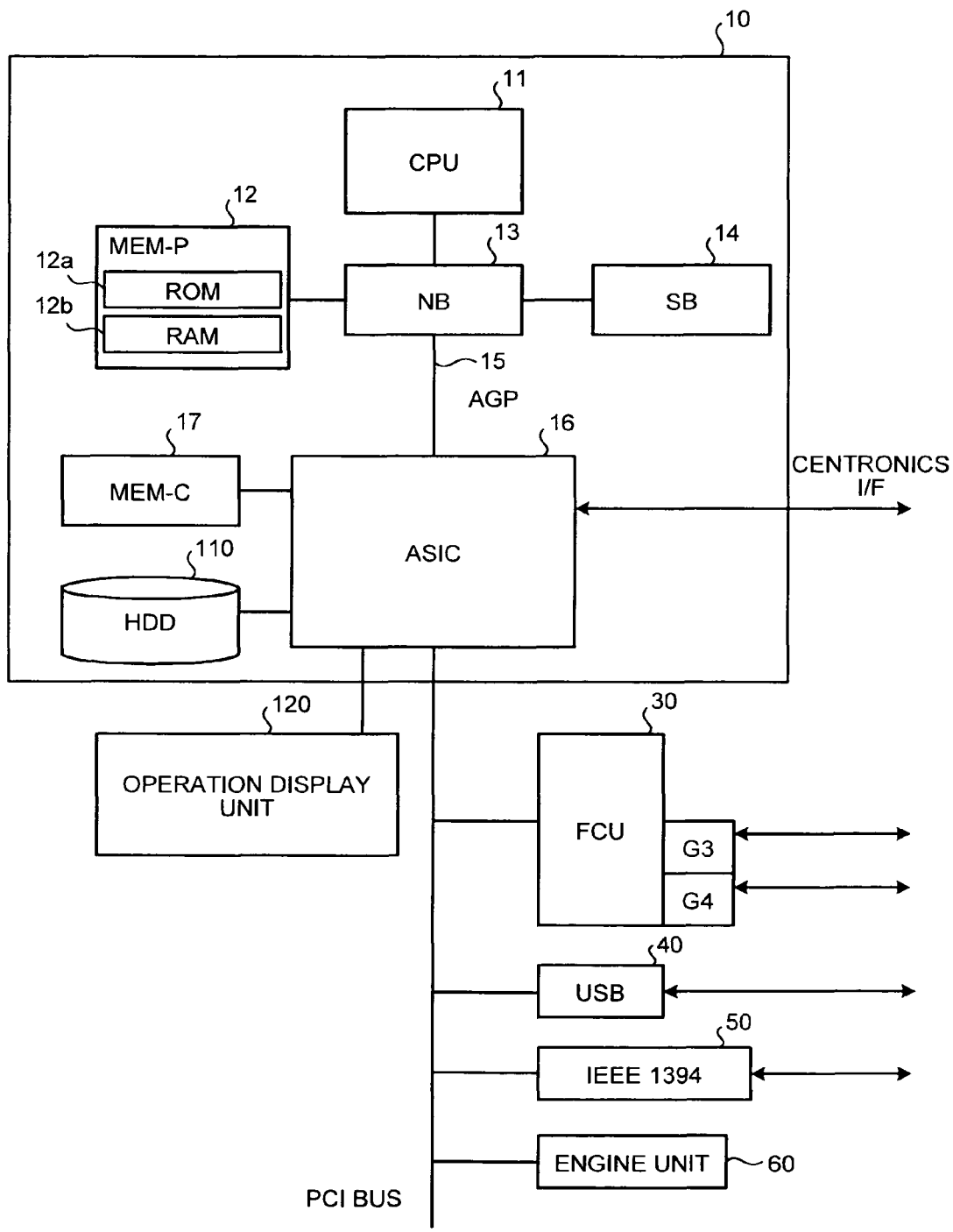
FIG. 14 is a block diagram illustrating a hardware configuration of the image forming apparatus according to the present embodiment.

FIG. 14 is a block diagram illustrating a hardware configuration of the image forming apparatus 100 according to the present embodiment. In FIG. 14, an example where the image forming apparatus 100 is implemented as an MFP 100 will be described. The MFP 100 includes a controller 10 and an engine unit 60 that are connected to each other over a peripheral component interface (PCI) bus. The controller 10 is a controller that controls the overall MFP 100, rendering, communications, and inputs from an operating unit (not shown). The engine unit 60 is a printer engine or the like that is connectable to the PCI bus. Examples of the engine unit 60 include a monochrome plotter, a one-drum color plotter, a four-drum color plotter, a scanner, and a facsimile unit. The engine unit 60 includes, in addition to what is called an engine section such as the plotter, an image processing section that performs error diffusion, gamma conversion, and the like.

The controller 10 includes a central processing unit (CPU) 11, a north bridge (NB) 13, a system memory (hereinafter, "MEM-P") 12, a south bridge (SB) 14, a local memory (hereinafter, "MEM-C") 17, an application-specific integrated circuit (ASIC) 16, and a hard disk drive (HDD) 110. The NB 13 and the ASIC 16 are connected with each other via an accelerated graphics port (AGP) bus 15.

The CPU 11 that performs overall control of the MFP 100 includes a chip set that includes the NB 13, the MEM-P 12, and the SB 14. The CPU 11 is connected with other devices via the chip set.

The NB 13 is a bridge that connects the CPU 11 with the MEM-P 12, the SB 14 and the AGP 15. The NB 13 includes a PCI master, an AGP target, and a memory controller that controls reading operation and writing operations from and to the MEM-P 12.

The MEM-P 12 includes a read only memory (ROM) 12a and a random access memory (RAM) 12b. The ROM 12a is a read only memory that stores therein computer programs and data. The RAM 12b is a writable and readable memory used as a memory for expanding computer programs and data therein, as a drawing memory for a printer function, and the like.

The SB 14 is a bridge that connects the NB 13 with PCI devices and peripheral devices. The SB 14 is connected with the NB 13 via the PCI bus, to which a network interface (I/F) and the like are also connected.

The ASIC 16 is an integrated circuit (IC) that includes a hardware component for use in image processing. The ASIC 16 functions as a bridge through which the AGP 15, the PCI bus, the HDD 110, and the MEM-C 17 are connected together. The ASIC 16 includes a PCI target and an AGP master, an arbiter (ARB), a memory controller, a plurality of direct memory access controllers (DMAC), and a PCI unit. The ARB is a core of the ASIC 16. The memory controller controls the MEM-C 17. The DMACs control rotation of image data by hardware logic or the like. The PCI unit transfers data between the engine unit 60 and the ASIC 16 via the PCI bus. A facsimile control unit (FCU) 30, a universal serial bus (USB) 40, and an IEEE 1394 interface 50 are connected with the ASIC 16 via the PCI bus. The operation display unit 120 is directly connected with the ASIC 16.

The MEM-C 17 is a local memory used as a buffer for storing therein images to be copied and codes. The HDD 110 is a storage device for storing therein image data, computer programs, font data, and forms.

The AGP 15 is a bus interface for a graphics accelerator card that is introduced to speed up graphics operations. The AGP 15 permits the graphics accelerator card to directly access the MEM-P 12 with a high throughput, thereby speeding up operations that involve the graphic accelerator card.

Image forming program instructions to be executed by the image forming apparatus of the present embodiment are provided as being stored in ROM or the like in advance.

The image forming program instructions to be executed by the image forming apparatus according to the present embodiment may be configured so as to be provided as being recorded in a computer-readable recording medium such as a compact disc-read-only memory (CD-ROM), a flexible disk (FD), a CD-recordable (CD-R), or a digital versatile disk (DVD) in an installable or executable format.

The image forming program instructions to be executed by the image forming apparatus according to the present embodiment may be configured so as to be stored in a computer connected to a network, such as the Internet, so that the program instructions are provided by downloading over the network. The image forming program instructions to be executed by the image forming apparatus according to the present embodiment may be configured so as to be provided or distributed over a network, such as the Internet.

The image forming program instructions to be executed by the image forming apparatus according to the present embodiment have a module structure that includes the units (the display control unit, the input control unit, the receiving unit, the acquiring unit, the determining unit, the converting unit, the detecting unit, the notifying unit, and the print control unit) described above. From the viewpoint of actual hardware, the CPU (processor) reads the image forming program instructions from the ROM and executes the program instructions to load the units on a main memory device, thereby generating the display control unit, the input control unit, the receiving unit, the acquiring unit, the determining unit, the converting unit, the detecting unit, the notifying unit, and the print control unit on the main memory device.

In the embodiment described above, the example where the image forming apparatus of the present invention is applied to the MFP that includes at least two functions of a copier function, a printer function, a scanner function, and a facsimile function; however, the image forming apparatus can be applied to any image forming apparatus, such as a copier, a printer, a facsimile, or a scanner.

According to an aspect of the present invention, there is yielded an effect that reprinting can be performed as intended by a user without scarifying image quality and operability.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus comprising:
a storage unit that stores therein print data and first converted data, the first converted data being obtained by reflecting a first print condition in the print data and converting the print data into a printable form;
an input receiving unit that receives an input of a reprint instruction to reprint the first converted data;
an acquiring unit that acquires a second print condition for reprinting the first converted data;
a determining unit that determines, when the input of the reprint instruction is received, whether the first converted data is printable in the second print condition by comparing the acquired second print condition against the first print condition reflected in the first converted data;
a converting unit that acquires, when it is determined that the first converted data is unprintable in the second print condition acquired by the acquiring unit, the print data from the storage unit, and converts the print data into second converted data by reflecting the second print condition in the print data; and
a print control unit that prints out the second converted data converted by the converting unit.

2. The image forming apparatus according to claim 1, wherein
the storage unit further stores therein identification information for identifying a user and a permitted print condition associated with the identification information, the permitted print condition being a print condition that the user is permitted to use,
the input receiving unit further receives an input of the identification information,
the acquiring unit acquires, from the storage unit, the permitted print condition associated with the identification information input of which has been received by the input receiving unit,
the determining unit compares the permitted print condition acquired by the acquiring unit against the first print condition reflected in the first converted data to determine whether the first converted data is printable according to the permitted print condition acquired by the acquiring unit, and
the converting unit acquires, when the first converted data is determined to be unprintable according to the permitted print condition acquired by the acquiring unit, the print data from the storage unit and converts the print data into third converted data by reflecting the permitted print condition in the print data.

3. The image forming apparatus according to claim 1, wherein
the storage unit further stores therein identification information for identifying a user and a preset print condition associated with the identification information, the preset print condition being a print condition set by the user,
the input receiving unit further receives an input of the identification information,
the acquiring unit acquires the preset print condition associated with the identification information input of which has been received by the input receiving unit from the storage unit,
the determining unit performs comparison between the preset print condition acquired by the acquiring unit and the first print condition reflected in the first converted data to determine whether the preset print condition contains the first print condition reflected in the first converted data, and
the converting unit acquires, when the preset print condition is determined not to contain the first print condition reflected in the first converted data as a result of the comparison, the print data from the storage unit and converts the print data acquired from the storage unit into fourth converted data by reflecting the preset print condition in the print data.

4. The image forming apparatus according to claim 3, wherein the preset print condition is an eco-friendly condition having been set in advance as a condition for saving resources to be consumed in printing.

5. The image forming apparatus according to claim 4, wherein the eco-friendly condition is at least any one of multiple-up printing, duplex printing, and toner-saving printing.

6. The image forming apparatus according to claim 1, wherein
the storage unit further stores therein time and date of storage of the print data, and time and date of update of a print condition,
the acquiring unit acquires the time and date of storage of the print data and the time and date of update of the print condition from the storage unit,
the determining unit compares the time and date of storage of the print data acquired by the acquiring unit against the time and date of update of the print condition acquired by the acquiring unit so as to determine whether the time and date of update of the print condition is later than the time and date of storage of the print data, and, when the time and date of update of the print condition is determined to be later than the time and date of storage of the print data, determines that the first converted data is unprintable in the second print condition, and
when the first converted data is determined to be unprintable in the second print condition, the converting unit converts the first converted data into the second converted data that reflects the second print condition.

7. The image forming apparatus according to claim 1, further comprising a detecting unit that detects a change in equipment status, wherein
the determining unit determines whether, if printing of the first converted data is performed in the second print condition acquired by the acquiring unit, the printing is to be suspended due to occurrence of an error, and, when it is determined that the printing is to be suspended, determines that the first converted data is unprintable in the second print condition,
when the first converted data is determined to be unprintable in the second print condition, the converting unit stores the first converted data in the storage unit as not-yet-processed converted data rather than converting the print data, and
when a change in equipment status is detected, the print control unit acquires the first converted data stored as the not-yet-processed converted data from the storage unit and performs printing of the first converted data.

8. The image forming apparatus according to claim 1, wherein
the determining unit determines whether, if printing of the first converted data is performed in the second print condition acquired by the acquiring unit, the printing is to be suspended due to occurrence of an error, and, when it is determined that the printing is to be suspended, determines that the first converted data is unprintable in the second print condition,
when the first converted data is determined to be unprintable in the second print condition; the converting unit stores the first converted data in the storage unit as not-yet-processed converted data rather than converting the print data, and
when a predetermined period of time has elapsed after the first converted data is stored in the storage unit as the not-yet-processed converted data, the print control unit acquires the first converted data stored as the not-yet-processed converted data from the storage unit and performs printing of the first converted data.

9. The image forming apparatus according to claim 7, further comprising:
a notifying unit that issues an error notification when it is determined that printing of the first converted data in the second print condition acquired by the acquiring unit is to be suspended by occurrence of an error; and
a print-condition receiving unit that receives an input of a change to the print condition, wherein
the detecting unit detects the input of the change as a change in equipment status,
the determining unit determines whether the first converted data is printable in a third print condition that is changed according to the change input of which is received by the print-condition receiving unit,
when the first converted data is determined to be printable in the third print condition, the converting unit converts the print data into fifth converted data that reflects the third print condition input of which has been received, and
the print control unit performs printing of the fifth converted data converted by the converting unit.

10. An image forming method comprising:
storing print data and first converted data in a storage unit, the first converted data being obtained by reflecting a first print condition in the print data and converting the print data into a printable form;
receiving an input of a reprint instruction to reprint the first converted data;
acquiring a second print condition for reprinting the first converted data;
determining, when the input of the reprint instruction is received, whether the first converted data is printable in the second print condition by comparing the acquired second print condition against the first print condition reflected in the first converted data;
acquiring, when it is determined that the first converted data is unprintable in the second print condition acquired at the acquiring, the print data from the storage unit, and converting the print data into second converted data by reflecting the second print condition in the print data; and
printing the second converted data.

11. A computer program product comprising a non-transitory computer readable medium including programmed instructions, wherein the instructions, when executed by a computer, cause the computer to perform:
storing print data and first converted data in a storage unit, the first converted data being obtained by reflecting a first print condition in the print data and converting the print data into a printable form;
receiving an input of a reprint instruction to reprint the first converted data;
acquiring a second print condition for reprinting the first converted data;
determining, when the input of the reprint instruction is received, whether the first converted data is printable in the second print condition by comparing the acquired second print condition against the first print condition reflected in the first converted data;
acquiring, when it is determined that the first converted data is unprintable in the second print condition acquired at the acquiring, the print data from the storage unit, and converting the print data into second converted data by reflecting the second print condition in the print data; and
printing the second converted data.

* * * * *